United States Patent [19]

Watson

[11] 4,033,600
[45] July 5, 1977

[54] BOAT GUIDE

[76] Inventor: Harry W. Watson, P.O. Box 9092, Shreveport, La. 71109

[22] Filed: Oct. 1, 1975

[21] Appl. No.: 618,375

[52] U.S. Cl. ............................... 280/414 R
[51] Int. Cl.² ............................... B60P 3/10
[58] Field of Search .......... 280/414 R, 414 A; 214/84, 505; 296/10, 36, 43; 9/1 A; 114/45, 65 R

[56] References Cited

UNITED STATES PATENTS

| 2,324,508 | 7/1943 | Johnson | 296/36 |
| 2,771,317 | 11/1956 | Dohrman | 296/43 X |
| 3,002,742 | 10/1961 | Troy | 280/414 R |
| 3,568,624 | 3/1971 | Bjorklund | 280/414 R |
| 3,632,138 | 1/1972 | Whiteley | 280/414 R |
| 3,885,146 | 5/1975 | Whitley | 280/414 R |

Primary Examiner—Robert R. Song
Assistant Examiner—John A. Pekar
Attorney, Agent, or Firm—John M. Harrison

[57] ABSTRACT

Custom fitted boat guides for boat trailers which function to keep the boat straight on the trailer during loading and unloading. The boat guides each consist of at least two padded legs spanned on one end by a padded support member, which legs are removably fitted to the frame of the trailer and may be adjusted with respect to the trailer frame as desired.

8 Claims, 6 Drawing Figures

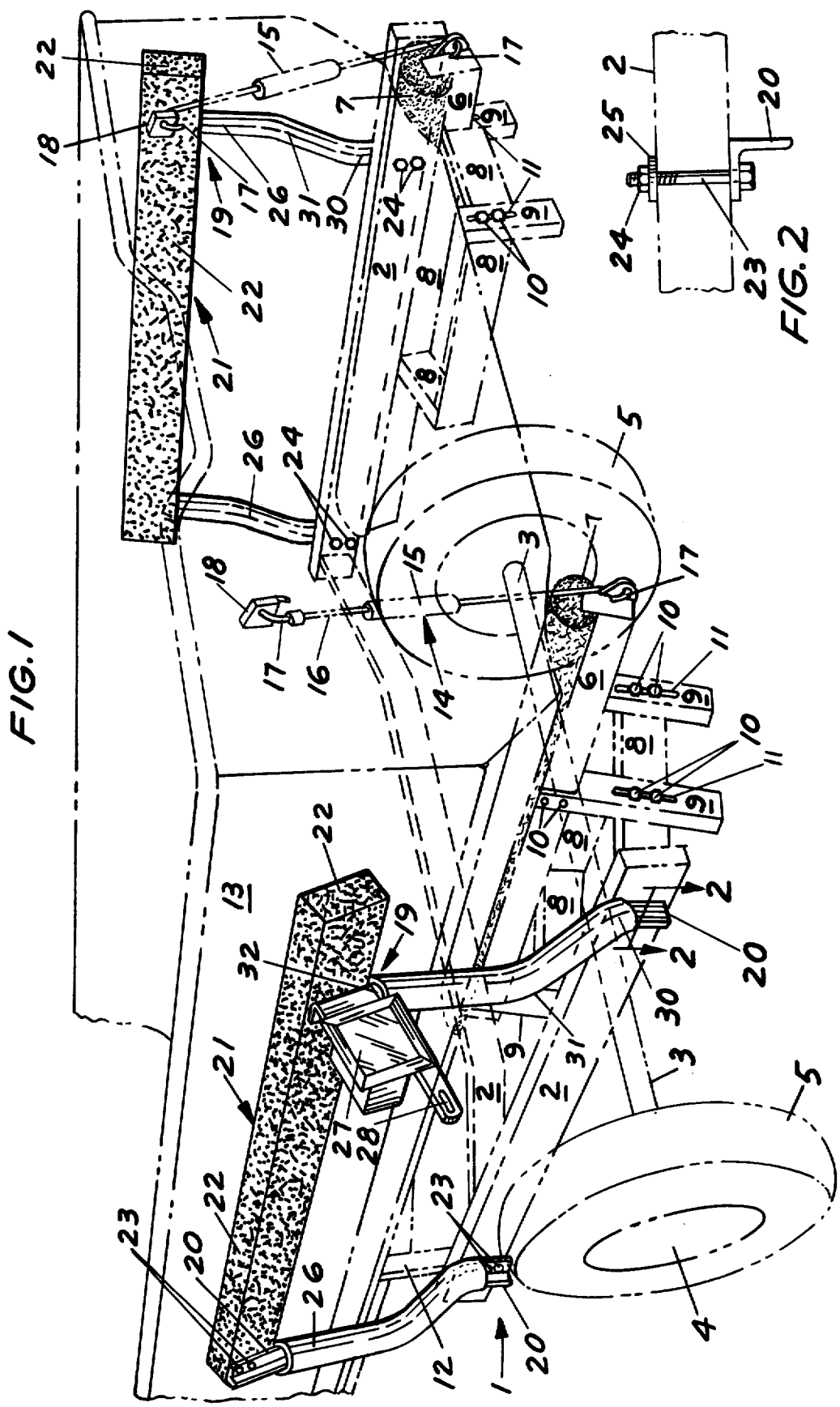

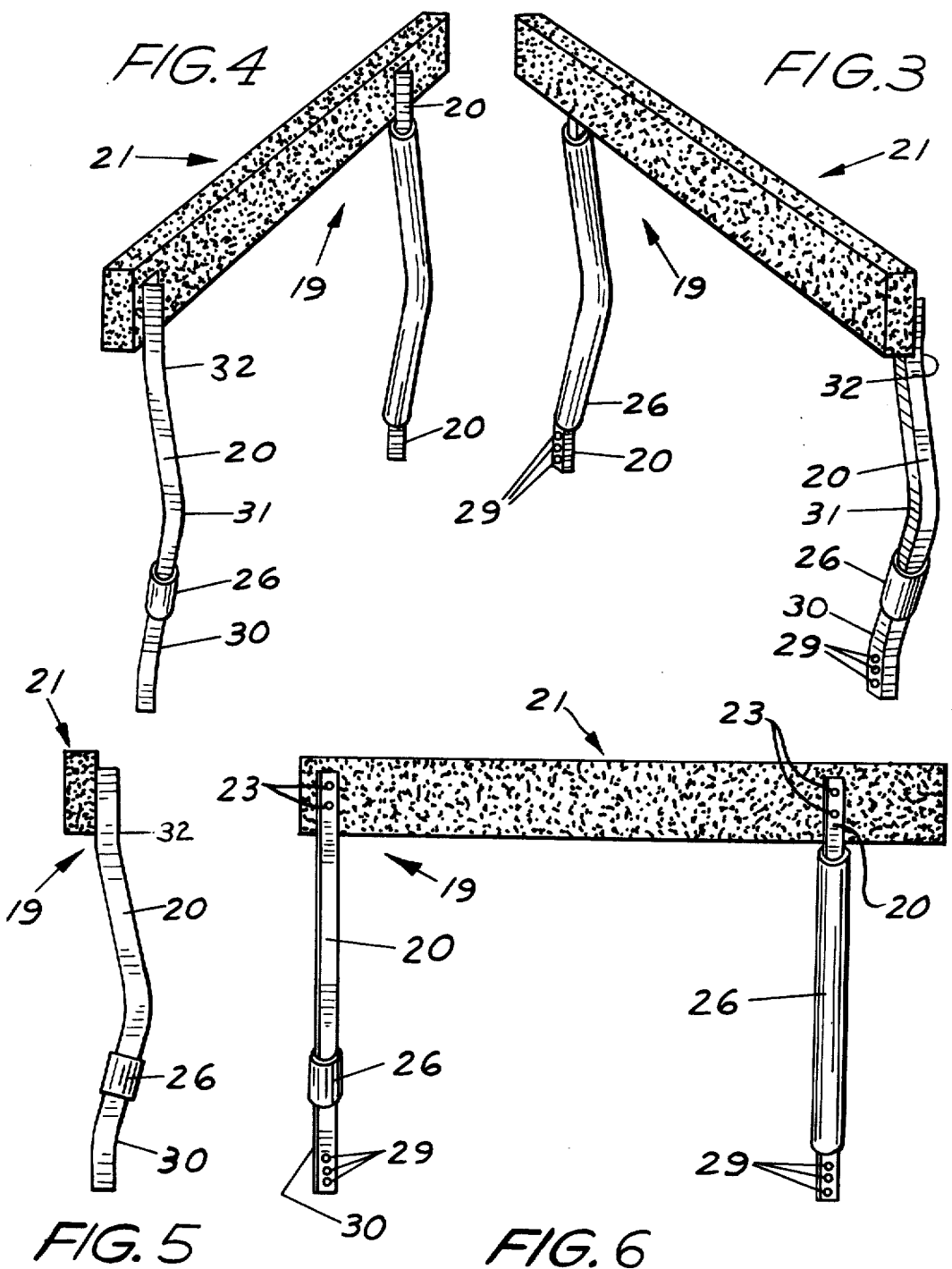

BOAT GUIDE

BACKGROUND OF THE INVENTION

1. Field of the Invention

This invention relates to boat trailers and more particularly, to boat trailers having boat guides mounted on each side to aid the operator in maintaining alignment of the boat with respect to the trailer during loading and unloading. The guides are designed to initially position the boat squarely in the center of the trailer during the loading operation, and to further insure that the boat stays in the center of the trailer while it is being pulled onto the trailer. The guides also serve to maintain proper boat alignment as the boat is released from the trailer during unloading and acts to prevent the boat from being thrown off of the trailer during trailering. The boat guide of this invention consists of a padded length of woolmanized lumber or alternative material, and at least one pair of legs attached to the board at either end, which legs are custom shaped to conform to the sides and bottom portions of a boat and are fitted for mounting on the trailer.

2. Description of the Prior Art

Heretofore, boat guides for use with boat trailers have taken the form of pipes or other projections mounted to the trailer frame and generally adapted to carry a taillight at the top portion of the projection. In the prior art little or no attention has been given to the shape of the projection in relationsip to the contour of a particular boat being carried by the trailer. This has been true since trailer manufacturers have in the past been concerned primarily with the following factors relative to trailer design and boat guides: first, elevating the taillights of the vehicle so that they are seldom, if ever, immersed when the trailer is lowered into the water during the loading and unloading operation; secondly, to form a reference point by which the driver of the automobile to which the trailer is attached might be able to guide the trailer into the water; and last, to aid in guiding the boat onto and off of the trailer during the loading and unloading operation, respectively.

During the past several years, due to the boom in water-related recreation, manufacturers of pleasure boats have offered and continue to offer to the public an apparently endless line of watercraft of all sizes and shapes, including both motor powered and said boats. With the advent of so many different boat sizes and configurations, coupled with the desire for mobility, came a variety of boat trailers designed to carry these pleasure boats. Accordingly, the need for boat guides which can be mounted on the various trailers, and which are custom fitted and tailored to a particular boat shape, became evident. For example, use of conventional guides with certain boats of recent design sometimes results in scraping the sides of the boat against the guide during the loading and unloading operation, thereby causing the boat to chip and crack or wear at the points where it touches the guide. Padding of the boat guides under such circumstances helps to prevent this damage, but in many cases the contact still causes chips and cracked spots in the finish of the boat, particularly in the case of fiberglass boats. This causes the appearance of the boat to be marred, and results in circumstances where the guides are not designed to be compatible with the boat configuration.

Accordingly, it is an object of this invention to provide boat guides for mounting on boat trailers, which are custom fitted to the trailer and tailored to fit the configuration of a selected boat.

Yet another object of the invention is to provide a set of boat guides for mounting on a boat trailer such that only the horizontal guide member is designed to touch the boat, and then only during the loading and unloading operation in order to permit the boat to be positioned squarely in the center of the trailer or in case the boat bounces on the trailer during trailering.

A still further object of the invention is to provide a pair of boat guides which can be removably fitted to substantially and boat trailer and adjusted with respect to that trailer to fit substantially any boat which is compatible with the trailer to prevent the boat from falling off of the trailer during trailering, and to guide the boat onto and off of the trailer.

Yet another object of this invention is to provide a pair of boat guides formed of angle iron legs, which legs are bent and custom shaped to conform to the side and bottom configuration of substantially any boat, and which legs can be removably and adjustably mounted on substantially any boat trailer.

A still further object of this invention is to provide a set of new and improved boat guides for removable mounting on boat trailers which are equipped with a pair of angle iron legs which are custom shaped and fitted with an appropriate bend or bends to conform to the configuration of a given boat, and are designed to carrying a woolmanized wooden guide padded with an appropriate covering, which guide is designed to randomly contact the sides of the boat during the loading and unloading operation to insure that the boat is loaded and unloaded across the longitudinal center-line of the trailer.

SUMMARY OF THE INVENTION

These and other embodiments of the invention are provided in a boat guide consisting of the following:

1. At least two legs per guide, preferably formed of angle iron and having holes drilled in the extreme ends thereof and shaped to be compatible with the configuration of a selected boat;

2. A guide carried in essentially horizontal position by one end of each of the two legs, which guide is preferably covered by an appropriate padding to avoid scarring or marring the finish of the boat; and 3. A suitable padding fitted over the legs to prevent scarring of the boat as it is loaded and unloaded from the trailer.

BRIEF DESCRIPTION OF THE DRAWINGS

The invention will be better understood in view of the following description presented with reference to the accompanying drawings.

FIG. 1 is a perspective view of the rear portion of a boat and boat trailer, illustrating a typical mounting of the boat guides of this invention and showing the guides in functional relationship removably mounted on the boat trailer;

FIG. 2 is a cross-sectional view along lines 2—2 of FIG. 1, illustrating a typical preferred technique for mounting the boat guide to a trailer;

FIG. 3 is a front perspective view of a boat guide of this invention;

FIG. 4 is a rear perspective of the boat guide illustrated in FIG. 3;

FIG. 5 is a right side elevation of the boat guide illustrated in FIGS. 3 and 4; and FIG. 6 is a rear elevation of the boat guide illustrated in FIGS. 3–5.

DESCRIPTION OF THE PREFERRED EMBODIMENTS

Referring now to FIG. 1 of the drawing, the rear portion of a boat trailer and boat is illustrated, with the boat trailer, generally illustrated by reference numeral 1, consisting of frame 2, carrying axle 3, to which is affixed wheels 4, carrying tires 5. Boat supports 6 are mounted longitudinally on frame 2 and are preferably made of wood and fitted with padding 7 to avoid damaging the bottom of boat 13, which rests on boat supports 6. Horizontal boat support braces 8 are designed to adjustably carry vertical boat support braces 9, the outside latter of which are attached to boat supports 6 by means of boat support brace bolts 10. Vertical boat support braces 9 are fitted with slots 11, and additional boat support brace bolts 10 are designed to register with slots 11 and with holes drilled in horizontal boat support braces 8 to allow boat supports 6 to be adjusted vertically. A similar set of horizontal and vertical boat support braces are mounted in adjustable relationship on the forward end of boat supports 6, with only a portion of one vertical boat support brace 9 illustrated in the drawing. Trailer tongue brace 12 serves to provide support between frame 2 and the boat trailer tongue (not illustrated), and tie-downs, generally illustrated by reference numeral, 14, equipped with tie-down spring 15, tie down cable 16 and tie-down hooks 17, communicate from the rear ends of boat supports 6, to cleats 18 mounted on boat 13. Tie-downs 14 are, of course, removable, and tie-down spring 15 serves to provide sufficient tension in the tie-down to secure boat 13 snugly against boat supports 6.

The boat guides, generally illustrated by reference numeral 19, are mounted on either side of boat 13, as illustrated and are positioned on frame 2 by means of legs 20, guide bolts 23, guide nuts 24 and guide washers 25, as more particularly illustrated in FIG. 2 of the drawing. Legs 20 of boat guide 19 are custom fitted to the contour of boat 13, as illustrated, with first angle 30, second angle 31 and third angle 32 provided in order to fit the contour of boat 13, and also to position guides 21, fixed to the opposite ends of legs 20, in proper position to guide boat 13 onto and off of boat trailer 1. Guides 21 are likewise fitted to legs 20 by means of guide bolts 23, guide nuts 24 and guide washer 25, as illustrated. Guides 21 are preferably padded with guide padding 22 in order to insure that the finish of boat 13 is not scraped or cracked during the loading and unloading operation as it is positioned in the center of boat trailer 1 by random contact with guides 21. As an additional precaution against scraping or checking of the boat, leg padding 26 is preferably provided on legs 20. Taillight 27 may be also fixed to guide 21, and license plate bracket 28 is typically attached to taillight 27, as illustrated.

It will be appreciated that first angle 30, second angle 31 and third angle 32 in legs 20 may be varied in degree, depending upon the particular configuration of boat 13 and the design of boat trailer 1. For example, if boat 13 is more narrow than the boat illustrated in the drawings, second angle 31 might be more acute then the angle illustrated in order to position guides 21 closer to boat 13. In the alternative, second angle 31 might be maintained substantially as illustrated, and first angle 30 made less acute to achieve the same result. Of course, both first angle 30 and second angle 31 may be adjusted in both boat guides 19 in order to position guides 21 in a selected spaced relationship to boat 13.

It will be further appreciated by those skilled in the art that guides 21 may be formed of substantially any material such as wood, fiberglass and the like, but is preferably made of woolmanized pine board. The board should be woolmanized or otherwise treated to resist rotting since it is periodically immersed in water, and is preferably covered by a guide padding 22, as illustrated in the drawing. Guide padding 22 may be substantially any material which is soft, resilient and waterproof, but is preferably a carpeted material, and care should be taken in the selection of such material since it has been found that any such material which is not made of plastic fibers with a rubber backing may easily rot. The padding material may be nailed or glued to the woolmanized board, but is preferably fixed in place on the board with 9/16 inch staples, which are preferably coated to provide resistance to rust. In order to insure that the tuck of the carpet is firm at the ends of the board, the tuck is preferably secured by galvanized nails. It will be appreciated that the particular size of the board or other material utilized as guide 21 may vary in size, depending upon the size of the trailer and the size and weight of the boat to be carried. For example, for boats in the range from about 12 feet to about 16 feet in length, a 2 inches by 4 inches woolmanized board about 6 feet long for each boat guide is preferred. In the case of larger and heavier boats, a 2 inches by 6 inches or perhaps even 2 inches by 10 inches plank of somewhat longer length is preferred.

It is preferred to join guide 21 to legs 20 by means of four carriage bolts, preferably 2½ inches by 5/16 inch long, and coated with a water-resistant material. Four corresponding 5/16 inch coated nuts, and four companion 5/16 inch treated lock washers are used to mate with the carriage bolts and secure legs 20 onto guide 21. However, it will be appreciated other techniques known to those skilled in the ary may be utilized as desired to join the legs and guide.

While substantially any material such as metal tubing or angle iron may be utilized to fabricate legs 20, angle iron is preferred, since it can be easily bent and welded into customized configurations to accommodate substantially any boat shape, and since holes may be readily drilled in one side of the angle iron to attach the legs to the guide and to the trailer. The angle iron utilized is preferably 1½ inches × 1½ inches × ¼ inch in dimension, since use of larger angle iron would only result in useless expense, and smaller legs would not be sufficiently strong, particularly in the case of heavy boats.

Referring now to FIGS. 3–6 of the drawings, boat guide 19 is illustrated detached from trailer 1 illustrated in FIG. 1, and guide holes 29, drilled in one side of legs 20 are illustrated, for mounting boat guide 19 on trailer 1. It will be appreciated that substantially any padding can be used to wrap legs 20, but a preferred padding is pipe insulation generally known as "Duracell", a trademark of F & W Products Company; an insulation segment having a 1⅜ inches diameter with a ½ inch wall thickness can be fitted concentrically over legs 20, and fits easily over first angle 30, second angle 31 and third angle 32, as illustrated. This insulation not only effectively guards the boat surface from harmful contact with legs 20, but also provides a pleasing appearance. In the alternative, legs 20 can be dipped in a plastisol solution in the liquid state and then removed from the plastisol, after which the material hardens and forms a plastic coating which will not scar or check a boat if contact is made between the boat and the coating. Other methods of padding which are known to those skilled in the art can be utilized as desired.

It will be appreciated that a preferred minimum clearance between boat 13 and guide 21 is about ¼ inch to about ½ inch on each side, to prevent the boat from bouncing from side to side on boat trailer 1 during trailering. Such a close tolerance also aids the loading and unloading operation, particularly on windy days, and eliminates the need for tiedowns 14 in most applications, unless an added trailering safety factor is desired.

Furthermore, while guide 21 is preferably fitted with two legs 20 for light and medium weight boats, in the case of heavy boats, additional legs 20 may be added as desired, to thoroughly stabilize boat 13 on boat trailer 1. For example, on a guide 21 which is eighty inches in length, three legs 20 are preferred, depending upon the weight of the boat to be trailered.

Having described my invention with the particularity set forth above what is claimed is:

1. A boat guide for boat trailers comprising:
   a. An essentially horizontally disposed guide means; and
   b. A pair of essentially vertically disposed, downwardly extending legs attached to said guide means at one end of each of said legs, and each of said legs having a first bend proximate said one end of said legs in a direction away from a vertical plane through the longitudinal center of said guide means; a second bend proximate the opposite end of said legs from said one end, for forming an end portion of said legs substantially parallel to said vertical plane; and a third bend between said first bend and said second bend in a direction toward said vertical plane to conform to the shape of the bottom and side portions of a boat; and
   c. Means for securing said one end of each of said legs to said guide means.

2. The boat guide of claim 1 wherein said guide means is a wooden member having an essentially rectangular shaped cross section and said second bend is in a direction away from said vertical plane.

3. The boat guide of claim 2 further comprising padding on the outside surface of said guide means.

4. The boat guide of claim 1 wherein said guide means is a wooden member having an essentially rectangularly shaped cross section, and said means for securing said one end of each of said legs to said guide means are bolts.

5. The boat guide of claim 1 wherein said legs are constructed of angle iron.

6. The boat guide of claim 1 wherein:
   a. Said guide means is a wooden member having an essentially rectangular shaped cross section and said means for securing said one end of each of said legs to said guide means are bolts;
   b. Said legs are constructed of angle iron, and further comprising padding on the outside surface of said guide means.

7. The boat guide of claim 1 further comprising padding on a portion of the outside surfaces of said legs.

8. The boat guide of claim 1 wherein:
   a. Said guide means is a wooden member having an essentially rectangular shaped cross section and said means for securing said one end of each of said legs to said guide means are bolts;
   b. said second bend is in a direction away from said vertical plane; and
   c. Said legs are constructed of angle iron; and further comprising padding on the outside surface of said guide means and on a portion of the outside surfaces of said legs.

* * * * *